(12) United States Patent
Revenus

(10) Patent No.: US 8,033,080 B2
(45) Date of Patent: Oct. 11, 2011

(54) ENCASEMENT FOR A HEIGHT-ADJUSTABLE SUPPORT COLUMN

(75) Inventor: Rolf Revenus, Karlsruhe (DE)

(73) Assignee: Maquet GmbH & Co. KG, Rastatt (DE)

( * ) Notice: Subject to any disclaimer, the term of this patent is extended or adjusted under 35 U.S.C. 154(b) by 185 days.

(21) Appl. No.: 12/490,416

(22) Filed: Jun. 24, 2009

(65) Prior Publication Data

US 2009/0321604 A1 Dec. 31, 2009

(30) Foreign Application Priority Data

Jun. 25, 2008 (DE) .................. 20 2008 008 574 U

(51) Int. Cl.
 E04C 3/30 (2006.01)
 E04G 25/04 (2006.01)
 E04H 12/18 (2006.01)

(52) U.S. Cl. ................ 52/834; 52/118; 52/843; 52/844; 52/632; 52/645

(58) Field of Classification Search .................... 52/831, 52/834, 835, 848, 843, 844, DIG. 8, 245, 52/118, 121, 64, 67, 632, 645; 248/354.1, 248/74.2, 603, 219.1, 911
See application file for complete search history.

(56) References Cited

U.S. PATENT DOCUMENTS

| | | | | |
|---|---|---|---|---|
| 3,930,565 A * | 1/1976 | Scheben et al. | ............... | 188/300 |
| 4,044,517 A * | 8/1977 | Schroter | ......................... | 52/248 |
| 4,192,479 A * | 3/1980 | Friebe et al. | ............... | 248/354.1 |
| 4,397,127 A * | 8/1983 | Mieyal | ............................. | 52/241 |
| 5,035,094 A * | 7/1991 | Legare | ............................ | 52/118 |
| 5,154,027 A * | 10/1992 | Warden | .......................... | 52/108 |
| 5,228,251 A * | 7/1993 | Frigon | ............................ | 52/111 |
| 5,513,825 A * | 5/1996 | Gutgsell | .................... | 248/188.5 |
| 5,528,782 A * | 6/1996 | Pfeuffer et al. | .................. | 5/611 |
| 5,803,653 A * | 9/1998 | Zuffetti | ........................ | 403/363 |
| 5,881,528 A * | 3/1999 | Grewe et al. | ..................... | 52/834 |
| 6,009,683 A * | 1/2000 | Grewe et al. | ..................... | 52/834 |
| 6,148,585 A * | 11/2000 | Baker | .............................. | 52/834 |
| 6,158,706 A * | 12/2000 | Johnson | ..................... | 248/354.3 |
| 6,494,005 B2 * | 12/2002 | Zimmerman | .................. | 52/296 |
| 6,505,364 B2 * | 1/2003 | Simmons et al. | ................. | 5/600 |
| 6,944,897 B2 * | 9/2005 | Koch | .............................. | 5/621 |
| 7,185,868 B2 * | 3/2007 | Wang | ............................ | 248/422 |
| 7,334,276 B2 * | 2/2008 | Pfeuffer et al. | .................. | 5/600 |
| 7,694,366 B2 * | 4/2010 | Koch et al. | ......................... | 5/608 |
| 7,818,839 B2 * | 10/2010 | Koch et al. | ......................... | 5/613 |
| 7,921,611 B2 * | 4/2011 | Olsen | ............................ | 52/111 |
| 2002/0050112 A1 * | 5/2002 | Koch et al. | ................. | 52/651.07 |
| 2003/0136061 A1 * | 7/2003 | Larsen | ............................ | 52/111 |

(Continued)

*Primary Examiner* — Brian Glessner
*Assistant Examiner* — Rodney Mintz
(74) *Attorney, Agent, or Firm* — McCormick, Paulding & Huber LLP

(57) ABSTRACT

In the encasement of a height-adjustable support column comprising a plurality of encasement elements (12) which are arranged annularly around the support column and which engage each other in a telescopic manner and can be slid relatively to each other in the axial direction of the support column, the encasement elements (12) each consisting of a material band (14) bent into a ring whose abutting edges (16) each have a rebate (20) bent backwards and are connected to each other by means of a retainer clip (22) having a C-shaped profile and clasping the rebates, at least one of the rebates (20) is provided with a recess (26) into which a locking element (28) provided on the retainer clip (22) can be engaged.

6 Claims, 3 Drawing Sheets

U.S. PATENT DOCUMENTS

| | | | |
|---|---|---|---|
| 2005/0144722 A1* | 7/2005 | Pfeuffer et al. | 5/600 |
| 2007/0107125 A1* | 5/2007 | Koch et al. | 5/600 |
| 2007/0107126 A1* | 5/2007 | Koch et al. | 5/600 |
| 2007/0107129 A1* | 5/2007 | Burstner et al. | 5/618 |
| 2009/0293422 A1* | 12/2009 | Brindle, Jr. | 52/854 |
| 2010/0050568 A1* | 3/2010 | Griffiths | 52/834 |
| 2010/0107340 A1* | 5/2010 | Koch et al. | 5/607 |

* cited by examiner

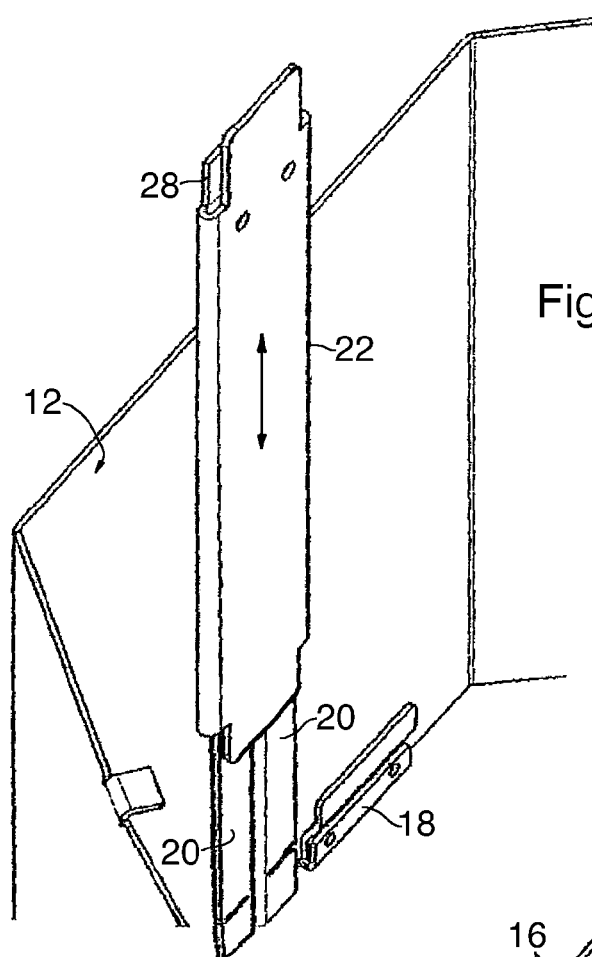
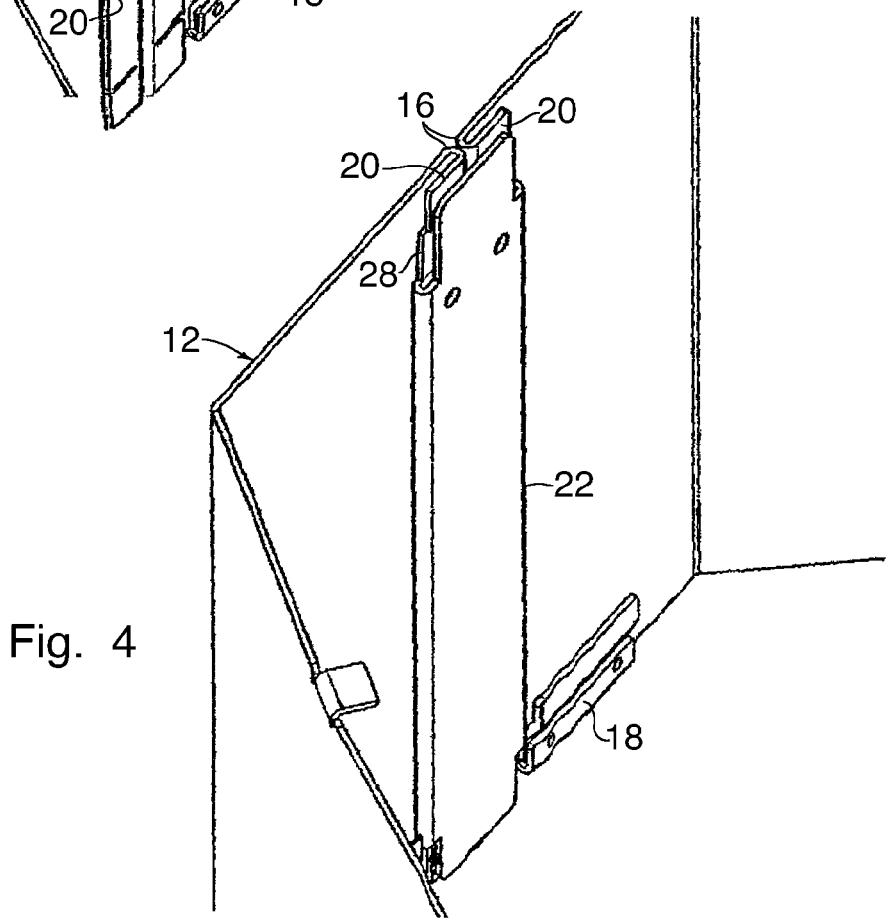

ENCASEMENT FOR A HEIGHT-ADJUSTABLE SUPPORT COLUMN

CROSS REFERENCE TO RELATED APPLICATIONS

Applicant hereby claims foreign priority benefits under U.S.C. §119 from German Patent Application No. 20 2008 008 574.8 filed on Jun. 25, 2008, the contents of which are incorporated by reference herein.

TECHNICAL FIELD

The invention relates to an encasement for a height-adjustable support column comprising a plurality of encasement elements, which surround the support column in an annular manner and which can be moved relative to each other in telescopic engagement in an axial direction of the support column, the encasement elements each consisting of a material band bent into a ring whose abutting edges each comprise a rebate folded backwards and which are connected with each other by means of a retainer clip having a C-shaped profile and clasping the rebates.

BACKGROUND ART

In particular the encasement is intended for the support column of an operating table. When the encasement needs to be replaced or access to the support column is needed for maintenance or repair, the annular elements of the encasement have to be opened. For this purpose the retainer clip has to be removed. In a known solution the rebates are provided with cuts close to their longitudinal ends which cuts extend perpendicularly to the longitudinal direction of the rebates so that when the retainer clip has been slid on, the lobes created by providing said cuts can be folded back behind the retainer clip towards the wall of the encasement element. There is a risk of damaging the exterior of the encasement element both when pushing the lobe against the wall of the encasement element and when bending the lobe away so as to again release the retainer clip.

BRIEF SUMMARY OF THE INVENTION

It is therefore an object of the invention to provide an encasement of the type mentioned above with a locking device in such a way that the retainer clip on the one hand can be locked securely in its locking position and on the other hand can be released again without damaging the encasement element.

This object is solved in accordance with the invention by providing at least one of the rebates with a recess, into which recess a locking element provided on the retainer clip is engageable.

By providing the locking element on the retainer clip, in order to lock and release the retainer clip it is only necessary to manipulate the retainer clip but not the encasement element itself whereby the risk of damaging the encasement element during opening or closing of the annular encasement element is avoided.

Preferably the retainer clip is made of metal and the locking element is made in the form of a flexible tongue. The tongue can therefore be simply flexed into or out of engagement with the recess provided in the rebate. The tongue may for example be provided on the end of a C-leg of the retainer clip.

In general the encasement element can be made of steel, for example of V2A steel, in which case the retainer clip is preferably made of a sliding material, such as a copper alloy.

Advantageously to enable sliding of the encasement elements relative to each other without scratching the exterior of the encasement elements, sliding elements intended to lie against the outside of the respective inner encasement elements are arranged on the inside of each encasement element.

BRIEF DESCRIPTION OF THE DRAWINGS

The following description in conjunction with the accompanying drawings explains the invention by means of an exemplary embodiment. In the drawings:

FIG. 3 shows an enlarged depiction of the locking area of an encasement element while a retainer clip is being slid on or removed, FIG. 4 shows a view similar to FIG. 3 where the retainer clip has been slid on completely.

DETAILED DESCRIPTION OF THE INVENTION

Figure 1:
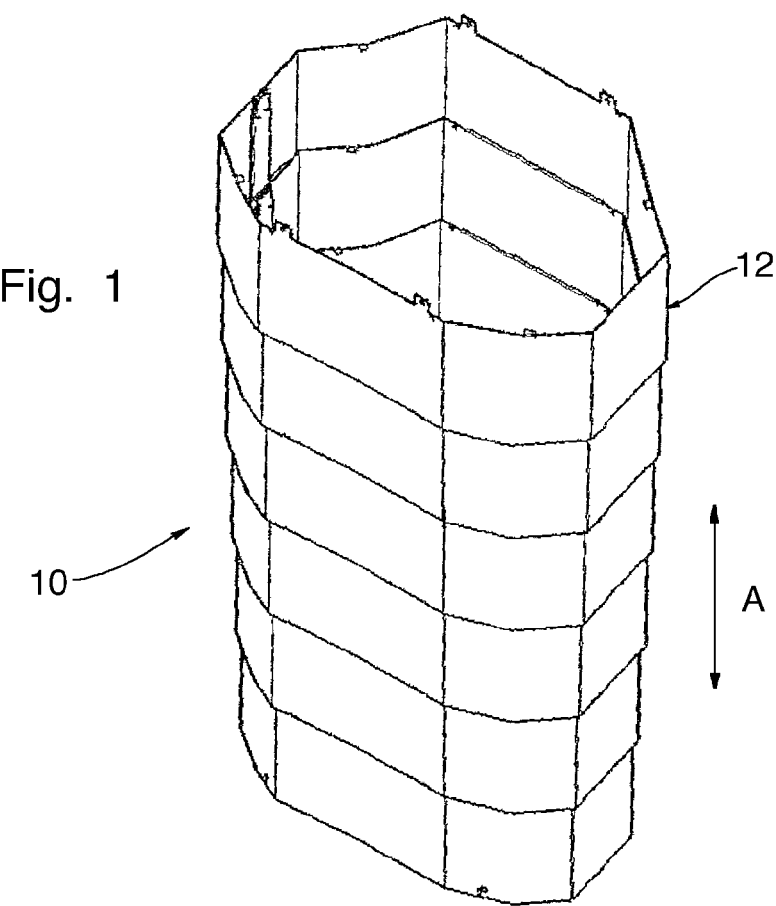
FIG. 1 shows a schematic general view of the column encasement.

FIG. 1 shows an encasement, generally denoted with 10, for a height-adjustable support column, not shown, of an operating table. The encasement 10 consists of a plurality of annular encasement elements 12 which engage with each other in a telescopic manner so that they can be pushed together or pulled apart, respectively, in the direction of the double arrow A, i.e. in the adjustment direction of the support column surrounded by the encasement 10.

Figure 2:
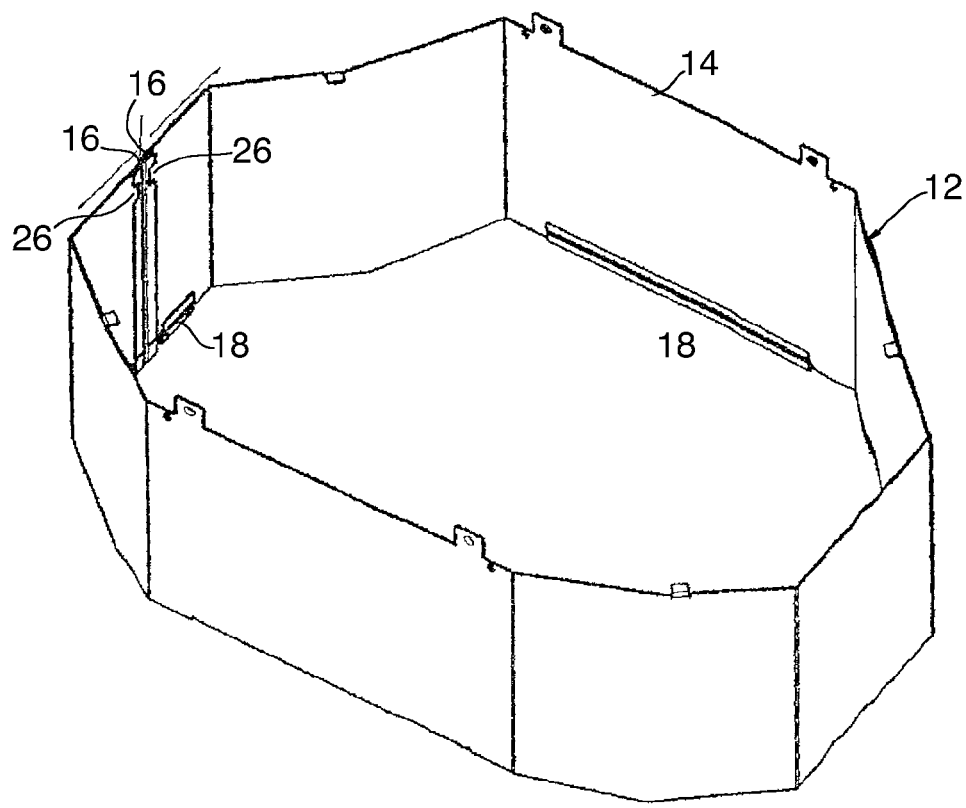
FIG. 2 shows an enlarged perspective view of a single encasement element.
Figure 5:
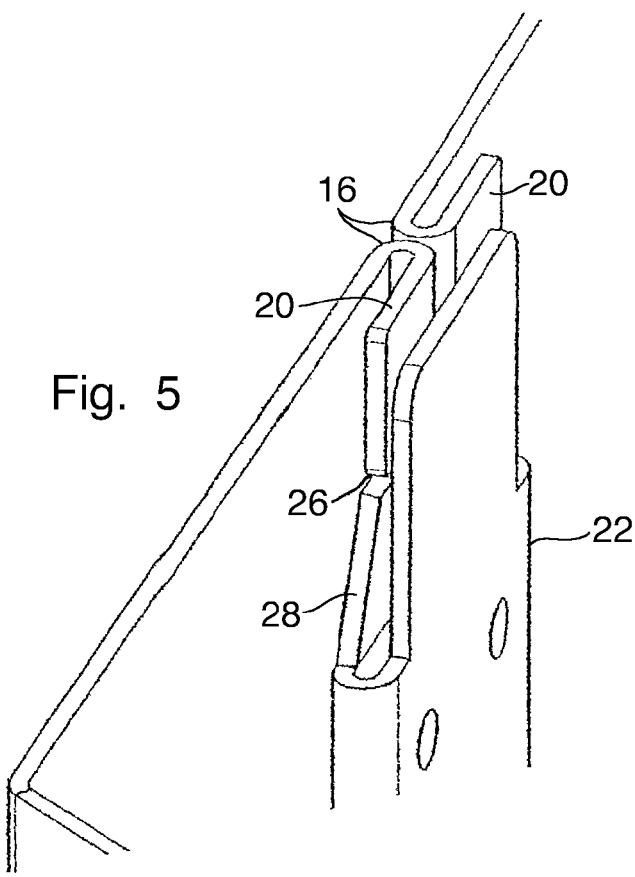
FIG. 5 shows an enlarged view of the locking area of an encasement element with a locking element being engaged in the recess provided in the rebate.

A single encasement element 12 is shown in FIG. 2. This element consists of a material band 14, usually made of steel, such as V2A steel, which has been bent into a ring whose longitudinal ends 16 abut each other and can be connected with each other by means of a retainer clip as shown in FIGS. 3 to 5. On the inside of the respective encasement element 12 sliding elements 18 are provided which are intended to abut against the outside of the adjoining encasement element engaged with the respective encasement element, so as to prevent scratching of the exterior of this element.

Telescopic encasements corresponding to FIG. 1 are known as such and therefore do not have to be explained in detail.

Figure 6:
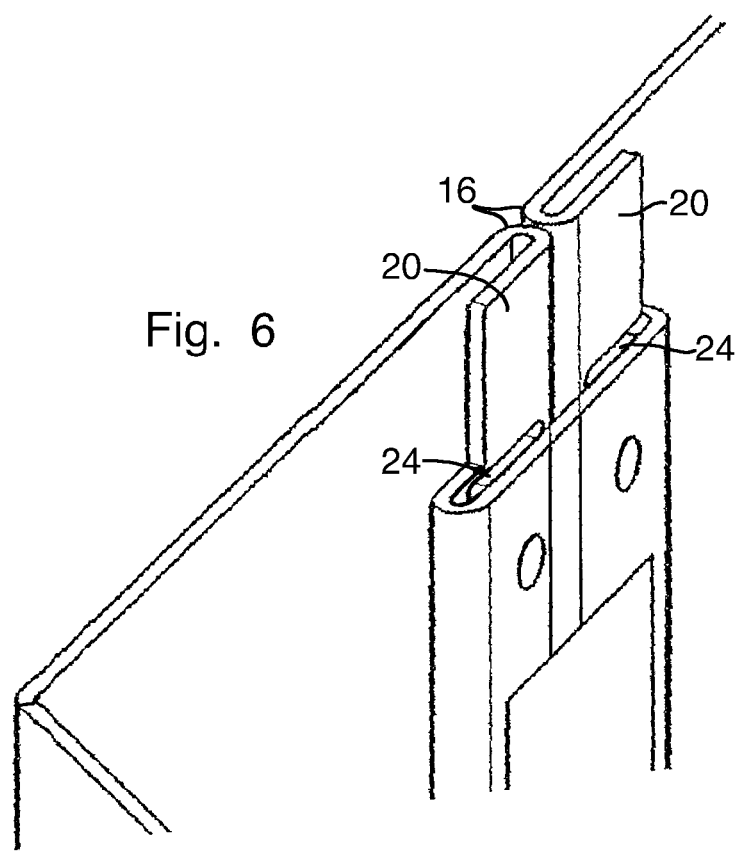
FIG. 6 shows a view similar to FIG. 4 of a conventional encasement element.

FIG. 6 shows the manner in which the ends 16 of the material band 14 are connected with each other in previously known encasement elements 12. The material band 14 is bent backwards at its ends or edges 16 facing each other so as to form rebates 20, which rebates 20 thereby extend parallel to the wall of the encasement element 12. Onto these rebates 20 a retainer clip 22 is slid, whose profile is C-shaped. The rebates 20 are provided with slits 24 close to their longitudinal ends which slits extend transversely to the longitudinal direction of the rebates. The lobes formed in creating these slits 24 can be bent in a direction towards the wall of the encasement element 12 after the retainer clip 22 has been slid on (FIG. 6) by e.g. pressing the rebate 20 against the wall of the encasement element 12 at this point by means of a calliper. By this the retainer clip 22 is locked in place in its position shown in FIG. 6. In order to be able to remove the retainer clip 22 and to open the encasement element 12, the lobes have to be bent away from the wall of the encasement element 12 and back into the position shown in FIG. 6. Both when bending the lobes against the wall and when bending them back, there is a risk of damaging the exterior of the encasement element 12. Moreover the lobes will have to be brought back into exact alignment with the rest of the rebate 20 in order to enable removing the retainer clip 22 without any problems.

In order to eliminate the above-mentioned drawbacks of the known solution, a recess 26 is provided in the respective rebate 20 close to its upper end (FIGS. 2 and 5), into which recess a tongue 28 formed on a C-leg of the retainer clip 22 can be engaged, as shown in FIG. 5, after the retainer clip has been slid into the position shown in FIG. 4, so that drawing off of the retainer clip 22 is prevented. Since the retainer clip is preferably made of a copper alloy, the tongue 28 can be simply bent into and out of the recess 26, and this can be done repeatedly, if necessary. In any case only the retainer clip but not the material band 14 of the encasement element 12 will be deformed.

The rebates 20 can be deformed on their respective lower ends in a suitable manner so as to prevent taking off the retainer clip 22 in a downward direction. This can be made in a permanent manner since it is sufficient to be able to take off the retainer clip 22 in one direction in order to open the encasement elements.

In the above exemplary embodiment the locking element was depicted as a tongue provided on the retainer clip and bendable into and out of engagement. However it is of course also possible to provide the locking element in the form of an elastic catch which engages automatically into the recess 26 and which can be deflected from it against its spring bias.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An encasement of a height-adjustable support column comprising a plurality of encasement elements which are arranged annularly around the support column and which engage each other in a telescopic manner and can be slid relatively to each other in the axial direction of the support column, the encasement elements each consisting of a material band bent into a ring whose abutting edges each have a rebate bent backwards and are connected to each other by means of a retainer clip having a C-shaped profile and clasping the rebates, wherein in at least one of the rebates a recess is provided into which recess a locking element provided on the retainer clip can be engaged.

2. The encasement according to claim 1, wherein the retainer clip is made of metal and in that the locking element is formed as a flexible tongue.

3. The encasement according to claim 2, wherein the tongue is formed on an end of a C-leg of the retainer clip.

4. The encasement according to claim 2, wherein the encasement element is made of steel and the retainer clip is made of a slideable material.

5. The encasement according to claim 4, wherein the retainer clip is made of a copper alloy.

6. The encasement according to claim 1, wherein the interior of each encasement element is provided with a slide element intended to abut against the exterior of the respective internal encasement element.

\* \* \* \* \*